United States Patent
Krishnan et al.

(10) Patent No.: US 8,451,087 B2
(45) Date of Patent: May 28, 2013

(54) PASSIVE ENTRY SYSTEM FOR AUTOMOTIVE VEHICLE DOORS

(75) Inventors: Venkatesh Krishnan, Wayne, MI (US); James Joseph Loschiavo, Livonia, MI (US); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1021 days.

(21) Appl. No.: 11/964,028

(22) Filed: Dec. 25, 2007

(65) Prior Publication Data

US 2009/0160211 A1      Jun. 25, 2009

(51) Int. Cl.
*G05B 19/00* (2006.01)
*E05C 3/16* (2006.01)

(52) U.S. Cl.
USPC ........ 340/5.72; 340/5.61; 340/5.64; 292/221; 292/222; 292/223; 292/225; 292/226

(58) Field of Classification Search
USPC ...................................... 340/5.61, 5.64, 5.72
See application file for complete search history.

(56) References Cited

U.S. PATENT DOCUMENTS

| | | | | |
|---|---|---|---|---|
| 4,686,912 A | * | 8/1987 | Fogleman et al. | 109/59 T |
| 5,140,316 A | * | 8/1992 | DeLand et al. | 340/12.11 |
| 5,369,911 A | * | 12/1994 | Fortunato | 49/25 |
| 6,290,269 B1 | | 9/2001 | Bodley-Scott | 292/216 |
| 6,801,134 B1 | * | 10/2004 | Juzswik | 340/12.51 |
| 6,825,752 B2 | | 11/2004 | Nahata | 340/5.64 |
| 7,046,119 B2 | | 5/2006 | Ghabra | 340/5.72 |
| 2003/0216817 A1 | * | 11/2003 | Pudney | 700/17 |
| 2006/0114100 A1 | | 6/2006 | Ghabra | 340/5.61 |
| 2006/0255906 A1 | | 11/2006 | Ghabra | 340/5.25 |
| 2006/0255908 A1 | | 11/2006 | Gilbert | 340/5.61 |
| 2007/0040649 A1 | | 2/2007 | Dulgerian | 340/5.64 |

* cited by examiner

*Primary Examiner* — Daniel Wu
*Assistant Examiner* — John Bamert
(74) *Attorney, Agent, or Firm* — Jason Rogers, Esq.; Miller Law Group, PLLC

(57) ABSTRACT

A passive entry system for an vehicle door requires no active operator input to gain entrance to the vehicle. A door module recognizes the signal transmitted by an authorized key fob to identify the operator of the vehicle. The authentication of the operator coupled with the operator touching a sensor on the door to be opened actuates a release actuator that unlatches the selected door. The spring-load provided by the door seal will pop the door open from the closed position. A key cylinder, which can be located substantially anywhere on the door, is coupled mechanically to the release latch for use if the battery is weak and cannot activate the release actuator. An LED signals the state of the opening sequence for the door. The fixed door handle can incorporate a membrane switch or a capacitive sensor to indicate the selection of the door by the operator when touched.

8 Claims, 2 Drawing Sheets

PASSIVE ENTRY SYSTEM FOR AUTOMOTIVE VEHICLE DOORS

FIELD OF THE INVENTION

This invention relates generally to a door latching system for an automobile and, more particularly, to a passive entry system that unlatches and releases the door of the automobile.

BACKGROUND OF THE INVENTION

Conventional door architecture for automobiles provides a movable door, typically pivotally mounted to the frame of the automobile for movement between a closed position latched against the frame of the automobile and an opened position in which the door is pivoted away from the frame to allow access and egress to the passenger compartment of the automobile. These conventional automotive doors carry a latch mechanism that engages a corresponding striker on the adjacent frame member of the automobile to secure the door in the closed position. The latch mechanism is operably coupled with a locking mechanism that fixes the latch mechanism in an engaged position to prevent the door from opening. The latch mechanism is typically mechanically connected to outside and inside door handles that when manipulated cause the latch mechanism to release from the latch keeper unless the lock mechanism is engaged. The lock mechanism can be released either mechanically or via an electronic signal that causes the lock mechanism to move to a position that allows the latch mechanism to release from the striker.

A passive entry system for an automotive vehicle would be defined as a system that will open the door of the vehicle without requiring conventional input from the operator, such as pulling on the outside door handle to affect a mechanical release of the latch mechanism or such as physically manipulating the lock mechanism, either mechanically or by requiring the operator to push a button on a key fob to send an electronic signal, to unlock the latch mechanism. A passive entry system is different from a passive unlock system for an automobile, which are known in the art as is indicated below, in that the passive unlock system simply causes the lock mechanism to unlock without requiring specific input from the operator, although the operator needs to provide a physical input to cause the door to open.

In U.S. Pat. No. 6,290,269, granted to Jamie Bodley-Scott, et al on Sep. 18, 2001, a passive vehicle door locking system is disclosed in which an integrated latch mechanism can receive mechanical inputs from the interior door handle and the exterior door handle. The electronic controller receives signals from a remote device, such as the key or the key fob, and is operated from the exterior of the vehicle. If the battery in the driver's key or key fob transmitter becomes discharged, the key or key fob could be provided with a passive transponder which can be energized, and can cooperate with a coil antenna provided at a known location in the door. The coil antenna will not be permanently energized, but will be energized for a predetermined period of time following a release movement of the exterior door handle. Thus, the driver will hold his key or key fob in the known proximity of the coil antenna to release the lock mechanism to allow the mechanical operation of the door handle.

Another passive unlock system is found in U.S. Pat. No. 6,801,134, granted to David Juzswik on Oct. 5, 2004, wherein the system includes an automatic-unlock transceiver/control operatively connected to a lock mechanism to control the operation thereof through use of an interrogation signal and a response signal. An identification transceiver carried by the operator may be in the form of a key fob. The portable transceiver receives the interrogation signal and responds with a response signal to gain access into the vehicle. The response signal conveys an appropriate security code to identify the portable transceiver. In response to the reception of response signal, the control provides a signal to the lock mechanism for actuation thereof. Thus, the authorized person can gain entry into interior of vehicle without manually operating any unlock device. The control utilizes an initiation stimulus that is indicative of the authorized person being in close proximity to vehicle and desiring entrance into the vehicle. A sensor is provided in conjunction with the door handle and is operatively connected to the control such that when hand of the authorized person reaches to actuate the handle, the interrogation sequence is initiated.

Similarly, in U.S. Pat. No. 6,825,752, issued on Nov. 30, 2004, to Pratik Nahata, et al, the control unit detects an intention of an operator to actuate the lock mechanism, such as an electronic solenoid lock, and transmits a challenge signal to determine whether the operator is authorized to operate the vehicle. An electronic key device, such as a key fob or electronic badge within the vicinity of the challenge signal, responds to the challenge signal through a transponder and transmits a key code to control unit. If the key code matches a security code stored by the control unit, an actuator may unlock the vehicle. The control unit may determine whether the port is already open by a position sensor and the control unit may also seek to determine whether operator has moved the latch, such as via a door handle, to further indicate the operator's intention to enter the vehicle. If the door is closed and the latch has been moved, the control unit may actuate the lock mechanism. An electronic apparatus operable to recognize a key fob and distinguish whether the key fob is located internally of the vehicle or externally is taught in U.S. Pat. No. 7,046,119, granted on May 16, 2006, to Riad Ghabra, et al.

A patent application by Riad Ghabra, et al, published as U.S. Patent Publication No. 2006/0114100 on Jun. 1, 2006, and related patent applications by Riad Ghabra No. 2006/0255906 on Nov. 16, 2006, and by Carl Gilbert, et al, published as U.S. Patent Publication No. 2006/0255908 on Nov. 16, 2006, teach a remote keyless vehicle unlock system that includes a portable communication device having a plurality of actuation buttons disposed on a face of the portable communication device. The portable communication device, such as a remote keyless entry (RKE) fob, broadcasts RF signals to a vehicle base communication module located within the vehicle for actuating vehicle entry functions such as unlocking and locking the vehicle door. The passive unlock system allows a user to unlock a vehicle without an actuation of a pushbutton on portable communication device 32 or other portable device. The system may be a polling or non-polling system. In a polling system, the communication module broadcasts a challenge signal at timed intervals for determining the presence of an authorized portable communication device when the vehicle doors are locked and the passive entry system is active. The portable communication device broadcasts a response RF signal to a vehicle based communication module for remotely actuating a respective vehicle entry function such as unlocking or locking vehicle door. Alternatively, a wake signal may be used in a polling system for waking the portable communication device prior to broadcasting the challenge signal. In a non-polling system, the vehicle based communication module waits for a triggering event, such as the actuation of vehicle door handle, before broadcasting the challenge signal to portable communication device.

A remote keyless entry system is disclosed in U.S. Patent Publication No. 2007/0040649 by James Dulgerian, et al, published on Feb. 22, 2007, in which a key fob acts as portable controller and has control buttons which instruct the vehicle via RF transmission to lock door and unlock doors. A door handle pull or other input may alert the door control module. When the portable controller is close enough to receive the signal, the controller responds with an encrypted RF signal that may include a module identifier. After receiving, decrypting, and validating the message, the system sends a command to unlock the door. The system can determine whether the portable controller is located internally or externally of the vehicle. The door controller may also receive input from wakeup switch, which may be connected to the door handle to provide a signal that the operator has lifted the door handle to gain access to the vehicle.

None of these prior art systems provide a true passive entry operation, as defined above. Accordingly, it would be desirable to provide a passive entry system that would recognize the operator and provide an apparatus that would be operable to unlock and open the vehicle door without requiring any active input from the operator, including the manipulation of the vehicle door handle, except to touch the vehicle to indicate the desire to open the respective door.

SUMMARY OF THE INVENTION

It is an object of this invention to overcome the aforementioned disadvantages of the known prior art by providing a passive entry system for an automotive vehicle.

It is another object of this invention to provide a passive entry system for a vehicle that is operable to identify the operator and to affect an unlocking and an opening of the selected vehicle door without requiring an active input from the operator.

It is a feature of this invention that the passive entry system can recognize the identity of the operator through the signal generated by an electronic key fob carried by the operator.

It is an advantage of this invention that the passive entry system can be adapted to a particular vehicle without requiring a re-design of the latch mechanism for the vehicle door.

It is another feature of this invention that the passive entry system still utilizes a key unlatch entry as a back-up system in the event the passive entry feature fails.

It is another advantage of this invention that the key unlatch can be located substantially anywhere on the vehicle door or hidden.

It is another advantage of this invention that the pivoted outside door handles can be eliminated.

It is still another feature of this invention that the pivoted outside door handles can be replaced by a fixed touch pad through which the operator indicates his choice for the door to be opened.

It is still another advantage of this invention that the inside door release lever can still be utilized to indicate a desire to open the door of the vehicle.

It is yet another feature of this invention that the passive entry system will not be operable to open or unlatch the vehicle door unless the operator is properly authenticated through the electronic key fob or other signal source.

It is yet another advantage of this invention that the outside door handle is not mechanically linked to the latch mechanism of the vehicle.

It is still another advantage of this invention that the fixed outside handle can be located anywhere on or near the vehicle door to facilitate styling requirements.

It is a further feature of this invention that the fixed outside handle can utilize a membrane switch or a capacitive sensor to signal the operator's indication of door selection.

It is still a further feature of this invention that an LED indicator can be utilized to indicate the locked state of the vehicle.

It is a further advantage of this invention that no lock/unlock levers or lock/unlock actuators are needed.

It is yet another feature of this invention that a separate lock mechanism is not needed as there is no pivoted outside door handle to secure against operation.

It is a further object of this invention to provide a passive entry system for unlocking and opening a vehicle door without active operator input that is durable in construction, inexpensive of manufacture, carefree of maintenance, facile in assemblage, and simple and effective in use.

These and other objects, features and advantages are accomplished according to the instant invention by providing a passive entry system for an automotive vehicle door in which no active operator input is required to gain entrance to the vehicle passenger compartment. A door module recognizes the signal transmitted by an authorized key fob to identify the operator of the vehicle. The authentication of the operator coupled with the operator touching a sensor on the door to be opened actuates a release actuator that unlatches the selected door. The spring-load provided by the door seal will pop the door open from the closed position. A key cylinder, which can be located substantially anywhere on the door, is coupled mechanically to release the latch for use if the battery is weak and cannot activate the release actuator. An LED signals the state of the opening sequence for the door. The fixed door handle can incorporate a membrane switch or a capacitive sensor to indicate the selection of the door by the operator when touched.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
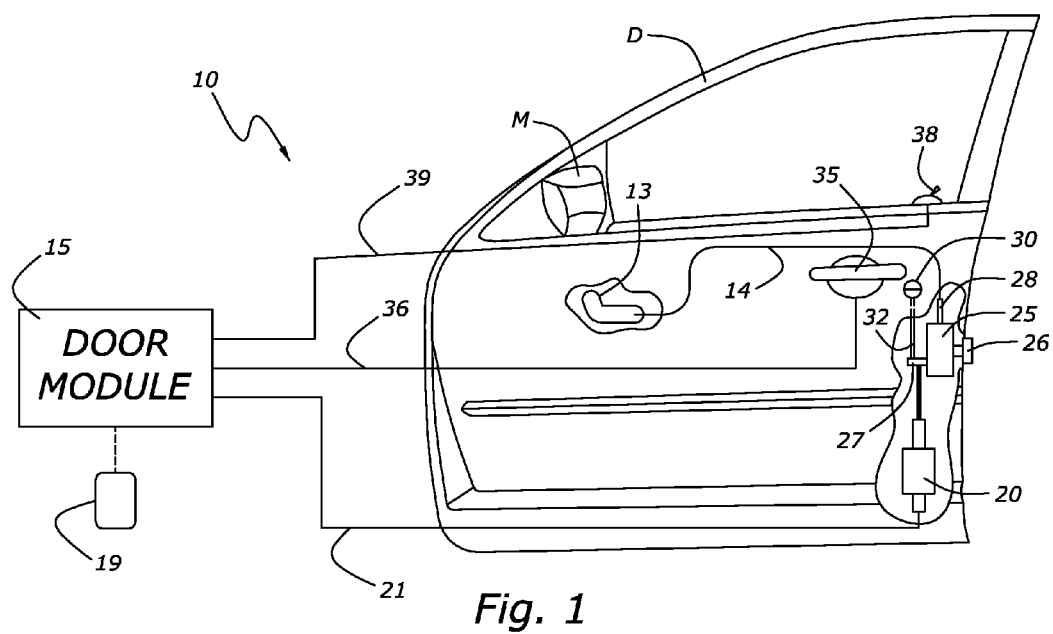
FIG. 1 is a schematic elevational view of an automotive vehicle door having a passive entry system incorporating the principles of the instant invention, portions of the door being broken away to better show components to the passive entry system.

Referring to the drawings, a passive entry system for a door on an automotive vehicle can best be seen. The passive entry system 10 includes an electronic door module 15 that can be mounted within the vehicle (not shown) remotely from the door D, such as within the instrument panel (not shown). The door module 15 is operable to receive a recognition signal from the operator, as will be described in greater detail below, to authenticate the operator through the received recognition signal, and generate a signal that unlocks the door and activates a door release actuator 20 through the wire 21 to open the door. A conventional latch mechanism 25 is mounted on the door D and engages a striker 26 supported on the automobile frame (not shown) to retain the door in a closed position that prevents entry into the passenger compartment of the vehicle. The latch mechanism 25 can be electronic or mechanical, and includes an outside release lever 27 that operates the latch mechanism 25 to release the striker 26. A second release lever 28 (an inside release) will be provided on the latch mechanism 25 for connection to the inside door handle 13, as will be described in greater detail below.

The door module 15 is operably connected to the release actuator 20, which is preferably in the form of a solenoid, that receives a signal or electrical current generated by the door module 15 through the wire 21 to affect actuation of the release actuator 20. The release actuator 20 is connected to the outside release lever 27 such that upon receiving the signal or electrical current from the door module 15 the release actuator 20 extends to move the outside release lever 27 and activate the latch mechanism 25 to release from the striker 26. An externally accessible key cylinder 30 is also mechanically connected to the outside release lever 27, preferably through a cable or rod 32 so that an insertion of the car key (not shown) into the key cylinder 30, and a subsequent turning of the car key, causes the cable or rod 32 to move the outside release lever 27 and affect a release of the latch mechanism 25. Accordingly, the key cylinder 30 provides a mechanical back-up for the electronic passive entry system 10.

Similar to the key cylinder 30, the inside door handle 13 is mechanically connected to the inside release lever 28 through a cable 14 so that the conventional pivoted inside door handle 13 can pull on the inside release lever 28 to affect a release of the latch mechanism 25 from inside the vehicle. One skilled in the art will recognize that the operation of either the key cylinder 30 or the inside door handle 13 could be electronically connected to the door module 15 to affect an actuation of the latch mechanism 25 through the door module 15. However, if either the key cylinder 30 or the inside door handle 13 were to be electronically operated, a separate mechanical back-up for these devices 30, 13 would need to be provided so that both ingress to and egress from the passenger compartment of the vehicle could be accomplished in the event of a failure of the passive entry system 10 or the presence of a weak or dead battery that is electrically powering the passive entry system 10.

Figure 2:
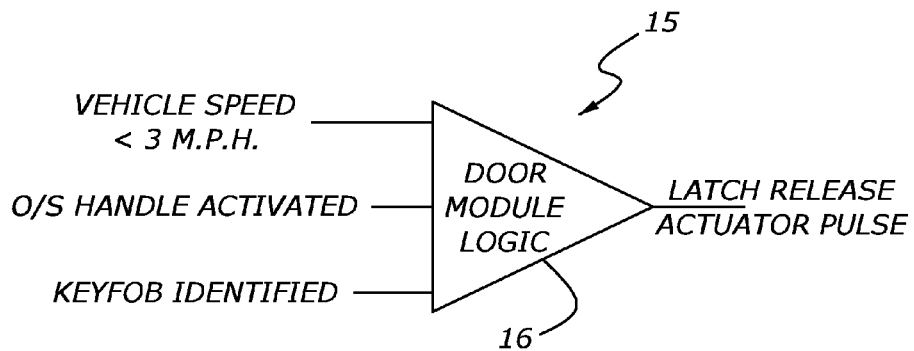
FIG. 2 is a schematic logic diagram of the passive entry system.

As can be seen in the schematic logic diagram of FIG. 2, the door module 15 is provided with a processor 16 that requires the presence of pre-existing conditions, as detected by appropriate sensors strategically located on the vehicle. For example, the processor 16 will require the speed of the vehicle to be less than a predetermined amount, such as three miles per hour. Furthermore, the operator, i.e. the key fob 19, would have to be authenticated, and a door would have to be selected by activating the outside sensor, as will be discussed in greater detail below, to enable a signal to be sent to the release actuator 20.

Figure 3:
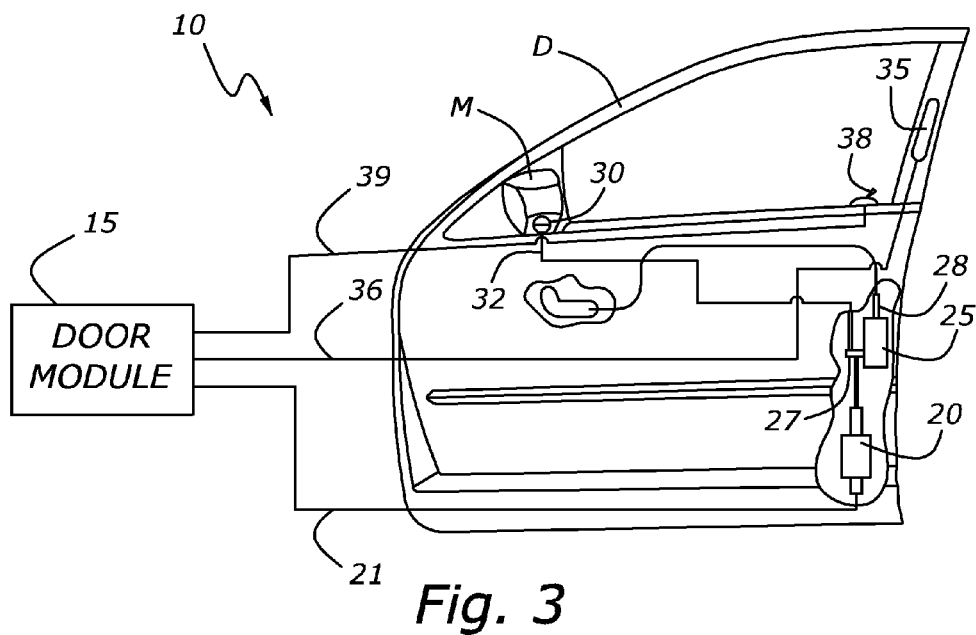
FIG. 3 is a schematic elevational view of the vehicle door depicted in FIG. 1, but showing a relocation of the fixed door handle and key unlock cylinder according to the principles of the instant invention.

The outside door handle 35 would preferably not be pivoted as is customary for conventional door handles. Since the outside door handle 35 is not pivoted and, thus, is not mechanically connected directly to the latch mechanism 25, no lock apparatus to prevent the operation of the outside door handle 35 needs to be provided. Preferably, the outside door handle 35 would be fixed in place and not be movable. Instead, the outside handle 35 need only be a sensor or switch and can be shaped in any manner and placed at any desirable or convenient location for communication with the door module 15 through the wire 36 to indicate an activation of the switch or sensor therein. For example, the outside door handle 35 could be shaped and configured to look like a conventional door handle, even though it does not move, and provided with a membrane switch or a capacitive sensor that would be capable of indicating that this door has been selected by the operator to be opened. Accordingly, the outside door handle 35 doesn't need to be a handle at all. As depicted in FIG. 3, the switch or sensor could be placed in an aesthetically pleasing location, such as along the window frame, or on a generally horizontal upper surface of the door. The outside switch/sensor could be substantially any size or any shape and, thus, presents very flexible design configurations.

Similarly, since the outside key cylinder 30 is not associated with a locking mechanism, the key cylinder 30 could be located at an aesthetically desirable place on the door. For example, as is depicted in FIG. 3, the outside key cylinder 30 could be hidden underneath the outside mirror M or at some other inconspicuous location. Furthermore, a cover could be provided for the outside lock cylinder 30 to prevent freezing and to improve corrosion protection. Also, since the passive entry system 10 does not utilize door locks, the door has no need for night lock rods, lock/unlock levers or lock/unlock actuators, a light emitting diode (LED) indicator 38 can be deployed at a readily visible location to indicate the closed, and thus locked, condition of the door. The LED indicator 38 is connected directly to the door module 15 via the wire 39 and will preferably glow when the door is properly closed. One skilled in the art would readily understand that the LED could also be utilized to indicate the receipt of the signal from the operator's key fob 19 and/or the authorization granted upon receipt of the key fob signal, as well as the satisfaction of all of the criteria for activating the release actuator 20, by utilizing different colors of LED or by utilizing a flash pattern on a single color indicator 38, or merely by extinguishing the LED.

One of the primary advantages of the passive entry system 10 according to the principles of the instant invention is that the latch design for the door does not need to be modified to be adapted to the system 10, as the passive entry system 10 will work directly with existing latch mechanisms 25. Furthermore, separate locking mechanisms are not needed to prevent an unauthorized entry into the vehicle through manipulation of the pivoted outside door handle, as the outside door handle 35 is fixed and operable only to sense the selection of the door by the operator for entry after authorization has been granted. The key cylinder 30 and the outside door handle 35 can be located anywhere on the door as the outside door handle 35 is utilized to send a sensor signal through the wire 36 to the door module 15 to indicate the selection of the door and the key cylinder 30 is only a mechanical back-up to the passive entry system 10 that is connected to the latch mechanism 25 for actuation thereof via the cable 32.

In operation, the operator carries a key fob 19 or other electronic device that emits a recognition signal to the door module 15 that is compared to the signal parameters stored in the door module. When the operator is sufficiently close to the vehicle that the door module will receive the proper recognition signal, the door module 15 will authorize entry, provided that the vehicle is not traveling at a speed greater than three miles per hour, or in the alternative is stopped. Upon the granting of authorization to the operator to select the door to be opened, the LED can switch from an illuminated condition, indicating a closed and locked state for the door, to a flashing pattern or the illumination of a different color of LED to indicate the granting of the authorization. If the battery in the key fob 19 or the battery in the vehicle are weak and the recognition signal is not transmitted by the key fob 19 or received by the door module 15, then the operator can utilize the car key to access the outside key cylinder 30 to actuate the latch mechanism 25 through the cable 32.

Assuming that the authorization is granted to the operator, the operator need only select the door to be opened. To make that selection, the operator need only to press the membrane switch or touch the capacitive sensor on the outside door handle 35 on the door or doors that are selected for opening. Once the door module 15 receives a signal from the selected outside door handle 35 through the wire 36, the door module 15 energizes the door release actuator 20 to unlatch the latch mechanism 25. Once the latch release 25 has been actuated by either the door module 25 or by the outside key cylinder 30, the spring-load imposed on the door by the seal between the door and the frame of the automobile pops the door into an opened position, allowing the operator to grasp and fully open the selected door(s).

One skilled in the art will recognize that a number of variations to this passive entry system 10 are within the scope of the instant invention. For example, the outside door handle 35 could be in the general shape of a conventional door handle, even though fixed in position relative to the door, with the membrane switch or capacitive sensor located on the inside grip surface of the fixed handle 35 so that the operator is required to grasp the handle 35 in a generally conventional manner to affect an opening of the door. Furthermore, the door module 15 can be configured such that only the driver's door can be opened through the passive entry system 10 with the grasping of the outside handle 35 affecting an unlocking of all of the other doors of the vehicle. Another variation is that the membrane switch or capacitive sensor in the outside door handle 35 can be pressed once for opening the selected door, and then pressed a second time to cause an unlocking of all of the other doors on the vehicle that are conventionally equipped with pivoting outside door handles and associated lock mechanisms. In the alternative, all of the doors of the vehicle can be associated with the passive entry system 10 and the second pressing of the membrane switch or capacitive sensor on the selected door would effect an authorization to effect an opening of the other doors of the vehicle through the subsequent pressing of the corresponding outside door handle 35 on the other door.

Other possible variations can include a supplemental spring member (not shown) to operate with the door latch mechanism 25, or a powered door opening mechanism (not shown), to insure that the door is popped into an open condition when the latch mechanism 25 is released. From the standpoint of being user friendly, the door may likely include a grip member of some sort to permit the grasping of the door to move the door into a fully opened position after being unlatched. Such a grip member may be provided best by a conventionally located outside handle member 35 that incorporates the membrane switch or capacitive sensor in an appropriate manner, such as is shown in FIG. 1.

As described above, the operator need not accomplish any specific active input, such as press a button on the key fob 19, or pull on an outside door handle 35 to cause an opening of the selected door and gain access into the vehicle through the selected door. The door module 15 can be configured that each operator of the vehicle is provided with a key fob that emits a different recognition signal so that the door module 15 will know, upon receipt of the recognition signal(s) who is approaching the vehicle and, thus, authorize entry to only selected door or doors of the vehicle. For example, if two people were approaching the vehicle and both people carried key fobs 19 configured to communicate with the door module 15, the door module 15 could authorize entry into both the driver's door and one other preselected door, such as the front passenger door.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A passive door entry system for an automotive door movable between a closed position and an opened position, comprising:
    a mechanical latch mechanism operable to restrain said automotive door in said closed position and to release said automotive door to move to said opened position;
    a spring device to bias said door from said closed position into said opened position;
    an electronically operated release solenoid operably engaged with said latch mechanism to activate said latch mechanism to release said automotive door to move to said opened position;
    a selector sensor associated with said automotive door to generate a selection signal when said door is selected for opening by activating said selector sensor;
    a first mechanical actuator directly interconnecting an interior door handle mounted on said automotive door and said latch mechanism by a first cable to actuate said latch mechanism when said interior door handle is manipulated;
    a second mechanical actuator independent of said first mechanical actuator and directly interconnecting an outside key cylinder and said latch mechanism by a second cable to actuate said latch mechanism through manipulation of said outside key cylinder, such that said latch mechanism is operably connected to all of said solenoid and said first and second cables each of which is selectively operable to affect the release of said automotive door; and
    an electronic door module operable to receive a recognition signal from a portable electronic device authorizing said door module to operate and to receive said selection signal, said door module operating to power said door release actuator to operate said latch mechanism to release said door so that said spring device will move said door into said opened position said spring device moving said door into said opened position when said latch mechanism is operated by any of said solenoid, said first mechanical actuator and said second mechanical actuator.

2. The passive door entry system of claim 1 wherein said selector sensor is mounted on an outside door handle secured to said automotive door.

3. The passive door entry system of claim 2 wherein said outside handle is fixed against movement relative to said door.

4. The passive door entry system of claim 3 wherein said door module powers said door release solenoid when both said recognition signal is verified against signal parameters stored in said door module and said selection signal is received from said selector sensor.

5. The passive door entry system of claim 1 wherein said outside key cylinder and said interior door handle by-passes said door module to open said door without requiring the operation of said door module to power the release of the door release solenoid to operate said latch mechanism.

6. An automotive door having an exterior side and an interior side, said door being movable between a closed position and an opened position, comprising:
- a mechanically operable latch mechanism operable to restrain said automotive door in said closed position and to release said automotive door to move to said opened position;
- an electronically operated door release actuator operably engaged with said latch mechanism to activate said latch mechanism, said door release actuator including a solenoid connected to said latch mechanism and operable when activated to operate said latch mechanism to release said automotive door;
- a selector sensor associated with said exterior side of said automotive door to generate a selection signal when said door is selected for opening by activating said selector sensor;
- an electronic door module operable to receive a recognition signal from a portable electronic device authorizing said door module to operate and to receive said selection signal to activate said solenoid and power said door release actuator to operate said latch mechanism to release said door so that a spring device will move said door into said opened position;
- an inside door lever accessible from said interior side of said door, said inside door lever being mechanically connected directly to said latch mechanism by a first cable for actuation thereof without requiring the operation of said door module; and
- a key operated mechanical by-pass mounted on the exterior side of the automotive door and being mechanically connected directly to said latch mechanism by a second cable independent of said first cable to permit actuation thereof without utilizing the door module, such that said latch mechanism is operably connected to all of said solenoid and said first and second cables each of which is selectively operable to affect the release of said automotive door, said spring device being operable to move said door into said opened position when said latch mechanism is actuated by any of said solenoid, said inside door lever through said first cable, and said key operated mechanical by-pass through said second cable.

7. The automotive door of claim 6 wherein said selector sensor is mounted on an outside door handle secured to said automotive door, said outside door handle being fixed against movement relative to the door.

8. The automotive door of claim 6 wherein said door module powers said door release actuator when both said recognition signal is verified against signal parameters stored in said electronic door module and said selection signal is received from said selector sensor.

* * * * *